（12）United States Patent
Ishikawa

(10) Patent No.: US 7,554,433 B2
(45) Date of Patent: Jun. 30, 2009

(54) WIRELESS TAG SCANNING SYSTEM

(75) Inventor: Atsushi Ishikawa, Izunokuni (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 90 days.

(21) Appl. No.: 11/364,931

(22) Filed: Mar. 1, 2006

(65) Prior Publication Data

US 2006/0214800 A1 Sep. 28, 2006

(30) Foreign Application Priority Data

Mar. 28, 2005 (JP) ............................ 2005-091396

(51) Int. Cl.
*H04Q 5/22* (2006.01)

(52) U.S. Cl. .................. 340/10.3; 235/385; 700/214; 700/221

(58) Field of Classification Search ... 340/572.1–572.9, 340/825.49, 10.3; 235/385; 700/214–217, 700/221–237
See application file for complete search history.

(56) References Cited

U.S. PATENT DOCUMENTS

| | | | |
|---|---|---|---|
| 6,195,007 B1 * | 2/2001 | Takayama et al. | 340/572.1 |
| 7,176,602 B2 * | 2/2007 | Schlenke | 310/348 |
| 7,176,799 B1 * | 2/2007 | Golicz et al. | 340/572.1 |
| 7,176,802 B2 * | 2/2007 | Fukuoka et al. | 340/572.7 |
| 7,268,687 B2 * | 9/2007 | Egbert et al. | 340/572.7 |
| 2001/0008390 A1 * | 7/2001 | Berquist et al. | 340/10.31 |
| 2002/0070862 A1 * | 6/2002 | Francis et al. | 340/572.1 |

FOREIGN PATENT DOCUMENTS

JP 2005-165473 6/2005

* cited by examiner

*Primary Examiner*—George A Bugg
*Assistant Examiner*—Edny Labbees
(74) *Attorney, Agent, or Firm*—Turocy & Watson, LLP

(57) ABSTRACT

Under the step management of a stepping motor, a move distance of an antenna of a wireless tag scanning device is calculated, and wireless tags are scanned in synchronization with a step move amount. The antenna controls its directivity using shield members etc., and lowers electromagnetic susceptibility in the moving direction. Accordingly, it becomes possible to detect a wireless tag located on a certain position, enabling position management with high resolution.

5 Claims, 2 Drawing Sheets

WIRELESS TAG SCANNING SYSTEM

CROSS-REFERENCE TO RELATED APPLICATIONS

This application is based upon and claims the benefit of priority from the prior Japanese Patent Application No. 2005-91396, filed on 28th Mar., 2005; the entire contents of which are incorporated herein by reference.

BACKGROUND OF THE INVENTION

1. Field of the Invention

The present invention relates to a wireless tag scan system that scans data of a wireless tag without wires.

2. Description of the Related Art

Recently, systems using radio frequency identification (RFID) have been a focus of attention. It is possible to ascertain the presence of a management object in an area by attaching a wireless tag to the management object and scanning wireless tag identification information thereof. However, in case there exist a plurality of management objects, when finely differentiating their positional information, wireless tag scanning devices have to be arranged by the number of management sections, or a plurality of antennas have to be placed.

For example, when a plurality of antennas of a wireless tag scanning device are so arranged as to be perpendicular to one direction, identification information is scanned from wireless tags using the plural antennas, and the position of a management object is recognized at the crossing position of antennas used for scanning identical identification information, the position can be recognized even if wireless tag scanning devices and antennas are not arranged by the number corresponding to that of management sections.

However, the spatial resolution of the place is determined in an area where an electromagnetic wave generated from an antenna arrives, and the position of a management object cannot be detected with high resolution.

Furthermore, when preparing a plurality of antennas, the number of parts increases, which undesirably increases cost (refer to Jpn. Pat. Appln. Laid-Open Publication No. H10-336071).

BRIEF SUMMARY OF THE INVENTION

According to embodiments of the present invention, an object of the present invention is to enable position detection with high resolution and provide an inexpensive scanning system by moving an antenna section of a wireless tag scanning device, whose directivity is selectively directed, in a direction equal to that of wireless tags which are lined up in one direction, and scanning the wireless tags in synchronization with the move.

The present invention may provide a wireless tag scanning system that scans a wireless tag using an electromagnetic wave, comprising: a movable means for moving an antenna section of a wireless tag scanning device in parallel with one axis on which a plurality of management objects having attached thereto wireless tags with their directivity aligned are arranged; a position detection means for detecting a distance by which the antenna section moves; a directivity control means for selectively directing the directivity of the antenna section of the wireless tag scanning device to a direction perpendicular to the move axis; and a means for detecting the existence position of a wireless tag using detected identification information of the wireless tag and a move distance of the antenna section.

DETAILED DESCRIPTION OF THE INVENTION

Figure 1:
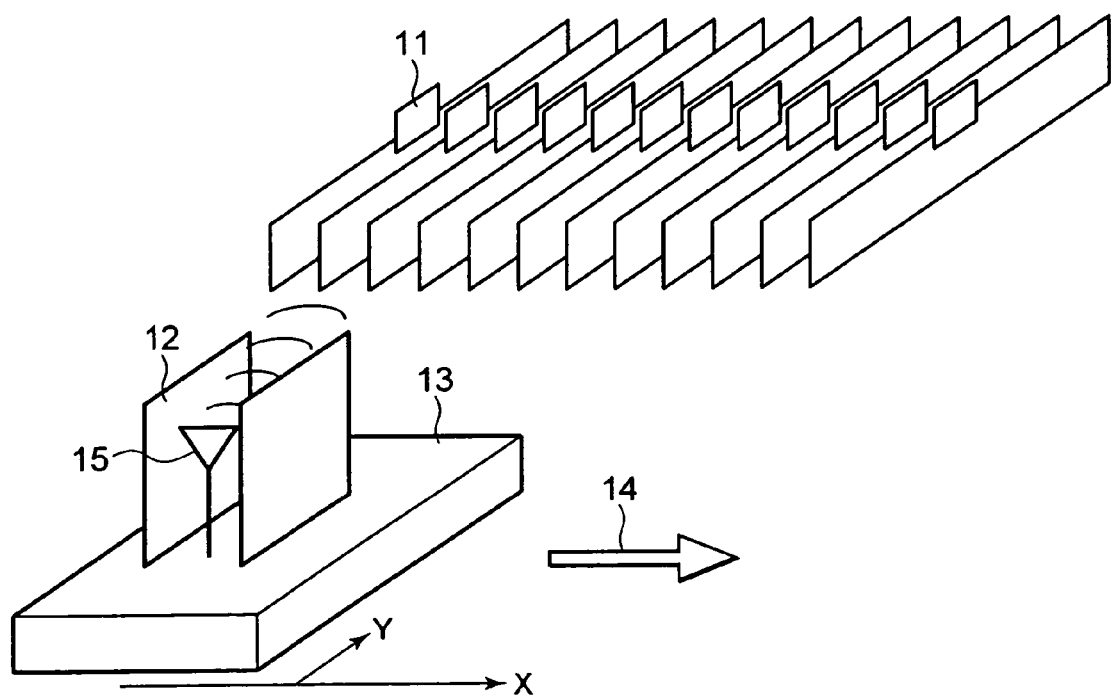
FIG. 1 shows a schematic view of a wireless tag scanning system indicative of one embodiment of the present invention.

The present invention will further be described below with reference to the accompanying drawings. FIG. 1 shows one embodiment of the present invention.

In FIG. 1, the referenced numeral 11 indicates a wireless tag, 12 indicates a shield member that controls the directivity of an antenna, 13 indicates a movable table for moving an antenna, 14 indicates a moving direction (moving means), and 15 indicates an antenna.

The wireless tags 11 are attached to management objects with their directivity aligned in the direction of the antenna 15. Then, the management objects are arranged on the X axis with equal spaces situated therebetween (the spaces do not necessarily have to be equal).

Figure 3:
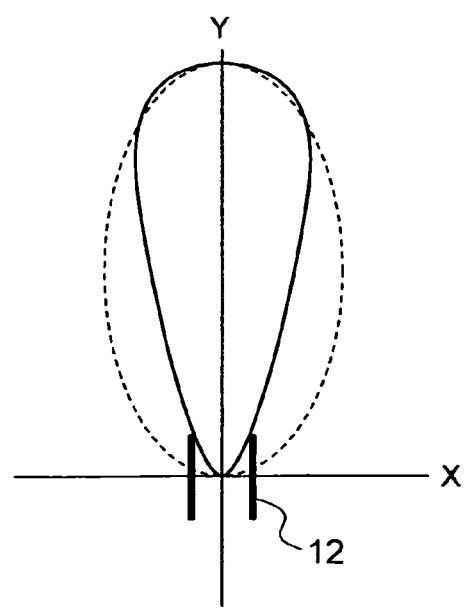
FIG. 3 shows a view indicative of an antenna output according to one embodiment of the present invention.

The movable table 13 that can move in the X axis direction has arranged thereon the antenna 15 of a wireless tag scanning device. The antenna 15 has its electromagnetic wave in the X-axis direction blocked by the use of at least two shield members 12 so as to selectively direct its directivity to the Y-axis direction. Accordingly, as shown in FIG. 3, the directivity of the antenna 15 spreads in the Y-axis direction on the horizontal plane, and the range where an electromagnetic wave arrives is restricted in the X-axis direction. The scannable distance in the X-axis direction is the spatial resolution that can recognize the position of a management object.

The moving means 14 is a linear motor that can linearly move in the X-axis direction, and can carry out positioning with high accuracy under the step management of a stepping motor. The position of a management object can be specified by scanning identification information of the wireless tag 11 using a wireless tag scanning device in synchronization with a step move amount.

Figure 2:
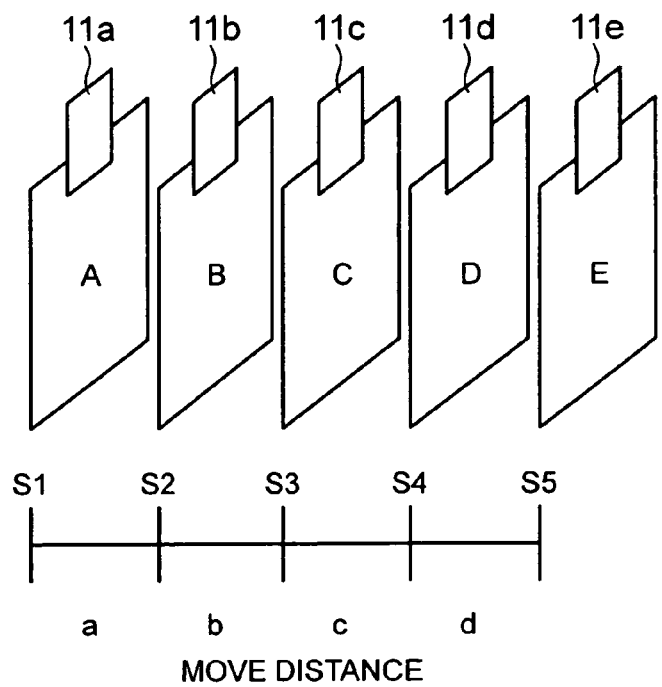
FIG. 2 shows a view for explaining the position detection by the wireless tag scanning system according to one embodiment of the present invention.

Referring to FIG. 2, the scanning method to detect the position of a management object having attached thereto a wireless tag will be explained in detail. Wireless tags 11a to 11e are attached to management objects A to E. Positions where the respective wireless tags are arranged are set to be S1, S2, S3, S4, S5, and "a", "b", "c", "d" indicate distances between these positions. The position of a management object can be specified by scanning the respective wireless tags 11a to 11e one by one at the respective positions S1, S2, S3, S4, S5.

The minimum distances "a", "b", "c", "d" under which the respective wireless tags 11a to 11e can be scanned one by one at the respective positions S1, S2, S3, S4, S5 are spaces that enable high-density position detection. The minimum condition required for the distances "a", "b", "c", "d" is that the management objects A and C are not recognized at the position S2, and the arrangement space for the management objects is larger than half of the spatial resolution of the antenna in the X-axis direction, that is, the scannable distance in the X-axis direction.

Even under the condition of recognizing a single wireless tag, there may be raised a case in which plural wireless tags are recognized. At the middle point between the S2 and S3, the management objects B and C are recognized, while at the middle point between the S3 and S4, the management objects C and D are recognized. On the other hand, in this case, it can be seen that the management object C is located at the middle point S3 between two positions where scanning is performed, by calculation.

By carrying out such calculation, it becomes possible to perform high-density position detection with higher accuracy. For example, it is assumed that the arrangement space for the management objects is one third of the spatial resolution of the antenna. In this case, the management objects A, B are recognized at the position S1, the management objects A, B, C are recognized at the position S2, the management objects B, C, D are recognized at the position S3, the management objects C, D, E are recognized at the position S4, and the management objects D, E are recognized at the position S5. In this case also, it can be seen that the management object C is located at the middle point S3 among the positions S2, S3, S4 where identical identification information of C is scanned, by calculation. On the other hand, there may be raised possibility that error in specifying position become large.

According to the wireless tag scanning system according to the embodiments of the present invention, under the step management of a stepping motor, a move distance of an antenna of a wireless tag scanning device is calculated, and wireless tags are scanned in synchronization with a step move amount. The antenna controls its directivity using shield members etc., and lowers electromagnetic susceptibility in the moving direction. Accordingly, it becomes possible to detect a wireless tag located on a certain position, enabling position management with high resolution. Furthermore, since the antenna is made to move, the number of points setting an antenna can be reduced.

While the invention has been described hereinbefore, it should be understood that the invention is not limited to the embodiments, but various modifications, alternative constructions or equivalents can be implemented without departing from the scope and spirit of the present invention. For example, according to the present invention, the direction for scanning is one axis direction, or the X direction, while the scanning direction may be extended in the two-dimensional direction or in the three-dimensional direction.

What is claimed is:

1. A wireless tag scanning system that scans a wireless tag using an electromagnetic wave, comprising:
    movable means for moving an antenna section of a wireless tag scanning device in parallel with one axis on which a plurality of management objects having attached thereto wireless tags with their directivity aligned are arranged; position detection means for detecting a distance by which the antenna section moves; directivity control means for selectively directing the directivity of the antenna section of the wireless tag scanning device to a direction perpendicular to the move axis; and means for detecting the existence position of a wireless tag using detected identification information of the wireless tag and a move distance of the antenna section;
    wherein the arrangement space for the plural management objects is larger than half of the spatial resolution determined by the directivity in the move axis direction of the antenna section.

2. The wireless tag scanning device as set forth in claim 1, wherein the movable means uses a stepping motor.

3. The wireless tag scanning device as set forth in claim 1, wherein the position detection means calculates a move distance based on the step management of a stepping motor.

4. The wireless tag scanning device as set forth in claim 1, wherein the directivity control means for the antenna section blocks an electromagnetic wave emitted in the move axis direction by using at least two shield members.

5. The wireless tag scanning device as set forth in claim 1, wherein, in case identical identification information is scanned at plural scan positions, the means for detecting the existence position of a wireless tag sets the middle point among the plural scan positions to the existence position.

* * * * *